United States Patent
Satou et al.

(10) Patent No.: US 10,619,930 B2
(45) Date of Patent: Apr. 14, 2020

(54) HEAT EXCHANGER

(71) Applicant: DAIKIN INDUSTRIES, LTD., Osaka (JP)

(72) Inventors: Ken Satou, Osaka (JP); Masanori Jindou, Osaka (JP); Kouju Yamada, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 0 days.

(21) Appl. No.: 16/335,975

(22) PCT Filed: Sep. 15, 2017

(86) PCT No.: PCT/JP2017/033448
§ 371 (c)(1),
(2) Date: Mar. 22, 2019

(87) PCT Pub. No.: WO2018/056209
PCT Pub. Date: Mar. 29, 2018

(65) Prior Publication Data
US 2019/0264981 A1    Aug. 29, 2019

(30) Foreign Application Priority Data
Sep. 23, 2016    (JP) .................................. 2016-185285

(51) Int. Cl.
*F28D 1/02*    (2006.01)
*F25B 39/02*    (2006.01)
(Continued)

(52) U.S. Cl.
CPC .............. *F28D 1/024* (2013.01); *F25B 39/02* (2013.01); *F28D 1/053* (2013.01);
(Continued)

(58) Field of Classification Search
CPC ..... F28F 1/32; F28F 1/325; F28F 1/30; F28D 1/024; Y02B 30/22
See application file for complete search history.

(56) References Cited

U.S. PATENT DOCUMENTS

| | | | |
|---|---|---|---|
| 2013/0284416 A1* | 10/2013 | Jindou | F28F 1/325 165/181 |
| 2014/0338876 A1* | 11/2014 | Hokazono | F25B 39/022 165/181 |
| 2017/0248370 A1 | 8/2017 | Nakamura et al. | |

FOREIGN PATENT DOCUMENTS

| | | |
|---|---|---|
| JP | 2003-262485 A | 9/2003 |
| JP | 2006-010288 A | 1/2006 |

(Continued)

OTHER PUBLICATIONS

Description WO2017130399 (Year: 2017).*
(Continued)

*Primary Examiner* — Keith M Raymond
*Assistant Examiner* — Gordon A Jones
(74) *Attorney, Agent, or Firm* — Osha Liang LLP

(57) ABSTRACT

A heat exchanger includes: a plurality of flat pipes each having flat surfaces directed upward and downward, wherein the flat pipes are arranged in an up-down direction and extend in a fin stacking direction intersecting an air flow direction; and a plurality of heat transfer fins stacked in the fin stacking direction and each including: a plurality of cutouts into which the flat pipes are inserted, respectively, wherein the cutouts extend from a leeward side toward a windward side in the air flow direction; a plurality of fin main parts each formed between the cutouts adjacent to each other in the up-down direction; a fin windward part continuously extending from the fin main parts in the air flow direction toward the windward side of the cutouts; and a fin (Continued)

collar part extending from a peripheral portion of each of the cutouts toward one side in the fin stacking direction.

4 Claims, 10 Drawing Sheets

(51) Int. Cl.
  *F28D 1/053* (2006.01)
  *F28F 1/04* (2006.01)
  *F28F 1/30* (2006.01)
  *F28F 1/32* (2006.01)
  *F28F 1/02* (2006.01)

(52) U.S. Cl.
  CPC ............ *F28D 1/05358* (2013.01); *F28F 1/02* (2013.01); *F28F 1/04* (2013.01); *F28F 1/30* (2013.01); *F28F 1/32* (2013.01); *Y02B 30/22* (2013.01)

(56) References Cited

FOREIGN PATENT DOCUMENTS

| JP | 2011-64403 A | 3/2011 |
|---|---|---|
| JP | 2012-233680 A | 11/2012 |
| WO | 2013/105133 A1 | 7/2013 |
| WO | 2016/038652 A1 | 3/2016 |
| WO | WO-2017130399 A1 * | 8/2017 ............ F28D 1/053 |

OTHER PUBLICATIONS

International Preliminary Report on Patentability issued in Application No. PCT/JP2017/033448, dated Apr. 4, 2019 (8 pages).

International Search Report issued in corresponding International Application No. PCT/JP2017/033448 dated Nov. 21, 2017, with translation (5 pages).

Written Opinion of the International Searching Authority issued in corresponding International Application No. PCT/JP2017/033448 dated Nov. 21, 2017 (4 pages).

Office Action issued in corresponding Japanese Patent Application No. 2016-185285 dated Nov. 21, 2017, with translation (6 pages).
Extended European Search Report issued in corresponding European Application No. 17852982.2 dated Sep. 2, 2019 (4 pages).

* cited by examiner

HEAT EXCHANGER

TECHNICAL FIELD

The present invention relates to a heat exchanger, in particular, to a heat exchanger that includes a plurality of flat pipes and a plurality of heat transfer fins having cutouts into which the flat pipes are inserted.

BACKGROUND ART

As indicated in Patent Literature 1 (Japanese Unexamined Patent Application Publication No. 2012-233680), there is a heat exchanger that includes a plurality of flat pipes and a plurality of heat transfer fins having cutouts into which the flat pipes are inserted. In this heat exchanger, the flat pipes extend in a fin stacking direction intersecting an air flow direction. In addition, in this heat exchanger, the heat transfer fins are stacked in the fin stacking direction and each include a plurality of the cutouts into which the plurality of flat pipes are inserted, the cutouts extending from a leeward side toward a windward side in the air flow direction, a plurality of fin main parts each formed between the cutouts that are adjacent to each other, a fin windward part extending on the windward side of the plurality of cutouts in the air flow direction continuously with the plurality of fin main parts, and a fin collar part extending from a peripheral portion of each of the cutouts toward one side in the fin stacking direction. In other words, in each heat transfer fin of this heat exchanger, the cutouts into which the flat pipes are inserted are formed so as to extend from the leeward side toward the windward side in the air flow direction, and the fin windward part extending continuously with the plurality of fin main parts between the cutouts that are adjacent to each other is formed on the windward side of the cutouts in the air flow direction.

When the heat exchanger of Patent Literature 1 is used with the flat pipes arranged in an up-down direction in a state in which flat surfaces of the flat pipes are directed upward and downward, condensed water adhering to the heat transfer fins gathers at portions on the leeward side of the fin main parts in the air flow direction and drains by dripping down from leeward-side tip portions of the cutouts. Condensed water, however, drips from the leeward-side tip portions of the cutouts when the condensed water grows to a size that enables the condensed water to drip by its own weight. Accordingly, in such a condensed-water drainage structure, condensed water easily remains in spaces formed between the fin main parts adjacent to each other in the fin stacking direction on the upper side of fin collar upper portions, and it is thus difficult to obtain sufficient drainage performance.

SUMMARY

One or more embodiments of the present invention improve condensed-water drainage performance in a heat exchanger that includes a plurality of flat pipes arranged in an up-down direction in a state in which flat surfaces are directed upward and downward and a plurality of heat transfer fins that each include cutouts into which the flat pipes are inserted, the cutouts extending from a leeward side toward a windward side in an air flow direction, and a fin windward part extending on the windward side of the cutouts in the air flow direction continuously with a plurality of fin main parts each formed between the cutouts that are adjacent to each other in the up-down direction.

A heat exchanger according to a first aspect includes a plurality of flat pipes and a plurality of heat transfer fins. The flat pipes are arranged in an up-down direction in a state in which flat surfaces are directed upward and downward, the flat pipes extending in a fin stacking direction intersecting an air flow direction. The heat transfer fins each includes a plurality of cutouts into which the plurality of flat pipes are inserted, the plurality of cutouts extending from a leeward side toward a windward side in the air flow direction, a plurality of fin main parts each formed between the cutouts that are adjacent to each other in the up-down direction, a fin windward part extending on the windward side of the plurality of cutouts in the air flow direction continuously with the plurality of fin main parts, and a fin collar part extending from a peripheral portion of each of the cutouts toward one side in the fin stacking direction, the heat transfer fins being stacked in the fin stacking direction. Here, a portion of each of the fin collar parts along a flat upper surface, which is the flat surface on an upper side of the flat pipe, is a fin collar upper portion, the fin collar upper portion and the flat upper surface forming therebetween a gap extending in the air flow direction, the fin collar upper portion including a window portion through which a space that is between the fin main parts adjacent to each other in the fin stacking direction and that is on an upper side of the fin collar upper portion and the gap are in communication with each other.

Here, it is possible to guide condensed water adhering to the heat transfer fins from the spaces on the upper side of the fin collar upper portions, through the window portions formed in the fin collar upper portions, into the gaps formed between the fin collar upper portions and the flat upper surfaces. The condensed water guided into the gaps flows in the gaps toward windward-side tip portions of the cutouts, not toward leeward-side tip portions of the cutouts. The reason is that condensed water does not drip at the leeward-side tip portions of the cutouts until the condensed water grows to a size that enables the condensed water to drip by its own weight while the windward-side tip portions of the cutouts are connected to the fin windward parts in continuity with the plurality of fin main parts, and it is thus possible to send the condensed water smoothly from the windward-side tip portions of the cutouts to the fin windward parts. The condensed water that is thus sent to the fin windward parts drains downward through the fin windward parts.

Here, as a result of the window portions formed in the fin collar upper portions and the gaps formed between the fin collar upper portions and the flat upper surfaces functioning as condensed-water drainage passages so that condensed water drains through the fin windward parts, as described above, it is possible to improve condensed-water drainage performance.

A heat exchanger according to a second aspect is the heat exchanger according to the first aspect, in which the fin collar upper portion has a concave portion at a tip thereof, and the concave portion forms the window portion.

Here, as a result of the window portion being the concave portion provided at the tip of the fin collar upper portion, it is possible to easily form the fin collar parts in the heat transfer fins, and it is consequently possible to suppress an increase in costs of the heat exchanger.

A heat exchanger according to a third aspect is the heat exchanger according to the second aspect, in which the concave portion includes a plurality of concave portions formed at the tip of the fin collar upper portion in the air flow direction.

Here, as a result of the window portion (concave portion) including a plurality of window portions formed in the air flow direction, it is possible to rapidly guide condensed water adhering to the heat transfer fins from the spaces on the upper side of the fin collar upper portions into the gaps, and it is thus possible to further improve the condensed-water drainage performance.

A heat exchanger according to a fourth aspect is the heat exchanger according to any one of the first to third aspects, in which the fin collar upper portion includes a flare portion having a tip that curves upward into an R-shape, the gap is formed between the flare portion and the flat upper surface, and the window portion is formed in the flare portion.

Here, as a result of the gap being formed between the flare portion provided at the tip of the fin collar upper portion and the flat upper surface and the window portion being formed in the flare portion, it is possible to easily form the fin collar parts in the heat transfer fins, and it is consequently possible to suppress an increase in costs of the heat exchanger.

A heat exchanger according to a fifth aspect is the heat exchanger according to any one of the first to fourth aspects, in which the fin collar upper portion is in contact with the heat transfer fin adjacent thereto in the fin stacking direction.

Here, the fin collar upper portions also have a function of assuring not only the condensed-water drainage passages (the window portions and the gaps) but also an interval (fin pitch) between the heat transfer fins in the fin stacking direction.

BRIEF DESCRIPTION OF THE DRAWINGS

FIG. 8 is a view in which FIG. 7 is viewed from the windward side in an air flow direction.

DETAILED DESCRIPTION OF EMBODIMENTS

Hereinafter, embodiments of a heat exchanger and a modification thereof will be described on the basis of the drawings. Note that the specific configuration of the heat exchanger is not limited to the embodiments and the modification thereof described below and can be changed in a range not deviating from the gist of the invention.

(1) Configuration of Air Conditioner

Figure 1:
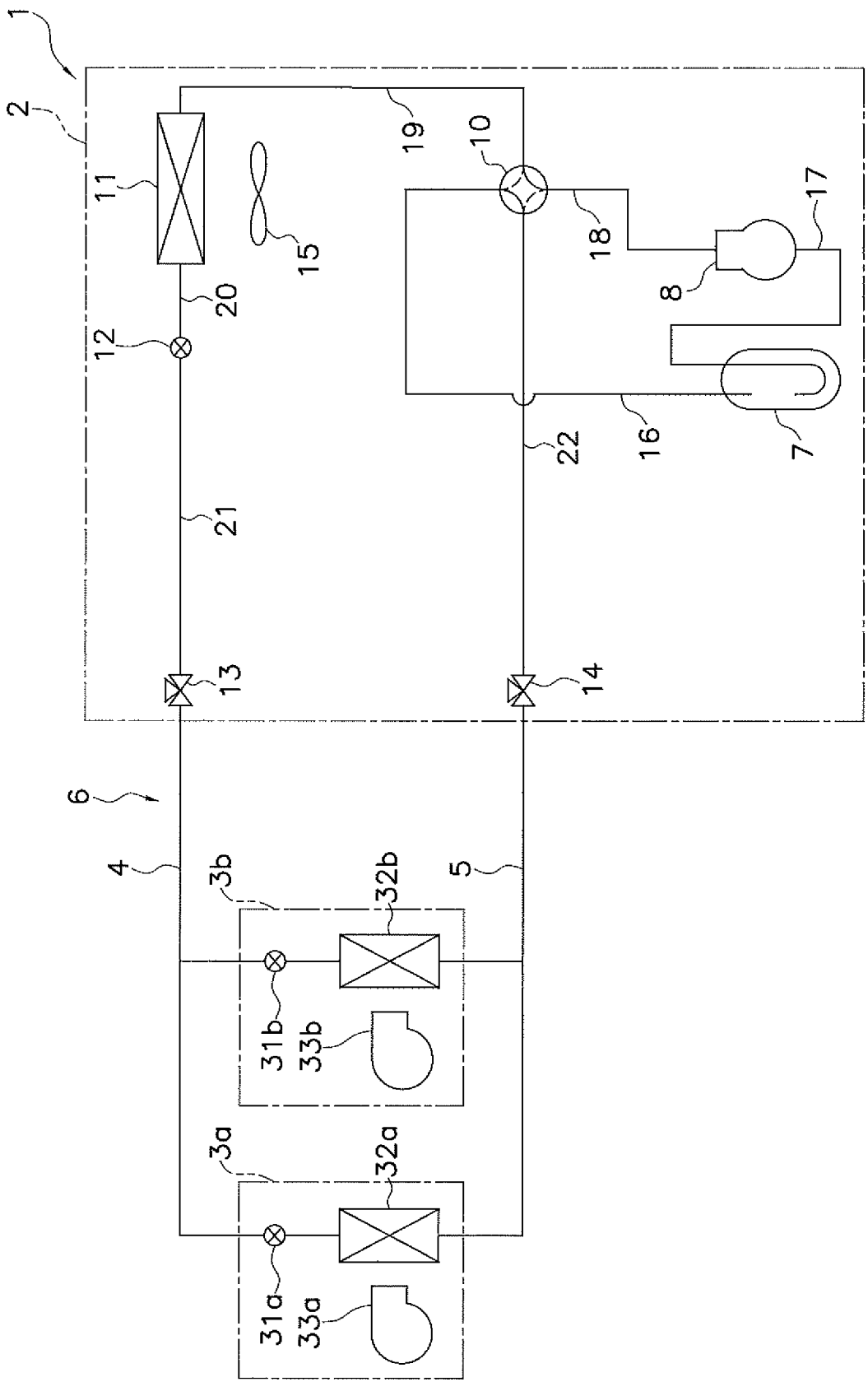
FIG. 1 is a schematic block diagram of an air conditioner employing an outdoor heat exchanger as a heat exchanger according to one or more embodiments of the present invention.

FIG. 1 is a schematic block diagram of an air conditioner 1 employing an outdoor heat exchanger 11 as a heat exchange according to one or more embodiments of the present invention.

The air conditioner 1 is an apparatus capable of performing indoor cooling and indoor heating of buildings and the like by performing a vapor compression refrigeration cycle. The air conditioner 1 is constituted by connecting, mainly, an outdoor unit 2 and indoor units 3a and 3b to each other. Here, the outdoor unit 2 and the indoor units 3a and 3b are connected via a liquid-refrigerant connection pipe 4 and a gas-refrigerant connection pipe 5. In other words, a vapor compression refrigerant circuit 6 of the air conditioner 1 is constituted by connecting the outdoor unit 2 and the indoor units 3a and 3b to each other via the refrigerant connection pipes 4 and 5.

The outdoor unit 2 is installed outdoors (on a rooftop of a building, in the vicinity of a wall surface of a building, or the like) and constitutes part of the refrigerant circuit 6. The outdoor unit 2 includes, mainly, an accumulator 7, a compressor 8, a four-way switching valve 10, the outdoor heat exchanger 11, an outdoor expansion valve 12, a liquid-side shutoff valve 13, a gas-side shutoff valve 14, and an outdoor fan 15. These devices and the valves are connected to each other via refrigerant pipes 16 to 22.

The indoor units 3a and 3b are installed indoors (in a living room, an attic space, or the like) and constitute part of the refrigerant circuit 6. The indoor unit 3a includes, mainly, an indoor expansion valve 31a, an indoor heat exchanger 32a, and an indoor fan 33a. The indoor unit 3b includes, mainly, an indoor expansion valve 31b, an indoor heat exchanger 32b, and an indoor fan 33b.

The refrigerant connection pipes 4 and 5 are refrigerant pipes that are constructed on site when the air conditioner 1 is installed at an installation location in a building or the like. One end of the liquid-refrigerant connection pipe 4 is connected to the liquid-side shutoff valve 13 of the outdoor unit 2, and the other end of the liquid-refrigerant connection pipe 4 is connected to liquid-side ends of the indoor expansion valves 31a and 31b of the indoor units 3a and 3b. One end of the gas-refrigerant connection pipe 5 is connected to the gas-side shutoff valve 14 of the outdoor unit 2, and the other end of the gas-refrigerant connection pipe 5 is connected to gas-side ends of the indoor heat exchangers 32a and 32b of the indoor units 3a and 3b.

(2) Operation of Air Conditioner

Next, operation of the air conditioner 1 will be described with reference to FIG. 1. The air conditioner 1 is capable of performing cooling operation and heating operation as basic operations.

During cooling operation, the four-way switching valve 10 is switched to a cooling cycle state (the state indicated by solid lines in FIG. 1). In the refrigerant circuit 6, a gas refrigerant having a low pressure for the refrigeration cycle is taken into the compressor 8 and discharged after compressed to a high pressure for the refrigeration cycle. The high-pressure gas refrigerant discharged from the compressor 8 is sent to the outdoor heat exchanger 11 through the four-way switching valve 10. In the outdoor heat exchanger 11, which functions as a refrigerant radiator, the high-pressure gas refrigerant sent to the outdoor heat exchanger 11 dissipates heat by exchanging heat with outdoor air that is supplied as a cooling source by the outdoor fan 15, thereby becoming a high-pressure liquid refrigerant. The high-pressure liquid refrigerant, which has dissipated heat in the outdoor heat exchanger 11, is sent to the indoor expansion valves 31a and 31b through the outdoor expansion valve 12, the liquid-side shutoff valve 13, and the liquid-refrigerant connection pipe 4. The refrigerant sent to the indoor expansion valves 31a and 31b is decompressed by the indoor expansion valves 31a and 31b to the low pressure for the refrigeration cycle, thereby becoming a low-pressure refrigerant in a gas-liquid two-phase state. The low-pressure refrigerant in the gas-liquid two-phase state decompressed by the indoor expansion valves 31a and 31b is sent to the indoor heat exchangers 32a and 32b. In the indoor heat exchangers 32a and 32b, the low-pressure refrigerant in the gas-liquid two-phase state sent to the indoor heat exchangers 32a and 32b exchanges heat with indoor air that is supplied as a heating source by the indoor fans 33a and 33b, thereby evaporating. The indoor air is consequently cooled and then supplied to a room, thereby performing indoor cooling. The low-pressure gas refrigerant, which has evaporated in the indoor heat exchangers 32a and 32b, is taken into the compressor 8 again through the gas-refrigerant connection pipe 5, the gas-side shutoff valve 14, the four-way switching valve 10, and the accumulator 7.

During heating operation, the four-way switching valve 10 is switched to a heating cycle state (the state indicated by broken lines in FIG. 1). In the refrigerant circuit 6, the gas refrigerant having the low pressure for the refrigeration cycle is taken into the compressor 8 and discharged after compressed to the high pressure for the refrigeration cycle. The high-pressure gas refrigerant discharged from the compressor 8 is sent to the indoor heat exchangers 32a and 32b through the four-way switching valve 10, the gas-side shutoff valve 14, and the gas-refrigerant connection pipe 5. In the indoor heat exchangers 32a and 32b, the high-pressure gas refrigerant sent to the indoor heat exchangers 32a and 32b dissipates heat by exchanging heat with the indoor air that is supplied as the cooling source by the indoor fans 33a and 33b, thereby becoming a high-pressure liquid refrigerant. The indoor air is consequently heated and then supplied to a room, thereby performing indoor heating. The high-pressure liquid refrigerant, which has dissipated heat in the indoor heat exchangers 32a and 32b, is sent to the outdoor expansion valve 12 through the indoor expansion valves 31a and 31b, the liquid-refrigerant connection pipe 4, and the liquid-side shutoff valve 13. The refrigerant sent to the outdoor expansion valve 12 is decompressed by the outdoor expansion valve 12 to the low pressure for the refrigeration cycle, thereby becoming a low-pressure refrigerant in the gas-liquid two-phase state. The low-pressure refrigerant in the gas-liquid two-phase state decompressed by the outdoor expansion valve 12 is sent to the outdoor heat exchanger 11. In the outdoor heat exchanger 11, which functions as a refrigerant evaporator, the low-pressure refrigerant in the gas-liquid two-phase state sent to the outdoor heat exchanger 11 evaporates by exchanging heat with the outdoor air that is supplied as the heating source by the outdoor fan 15, thereby becoming a low-pressure gas refrigerant. The low-pressure refrigerant, which has evaporated in the outdoor heat exchanger 11, is taken into the compressor 8 again through the four-way switching valve 10 and the accumulator 7.

(3) Configuration of Outdoor Unit

Figure 2:
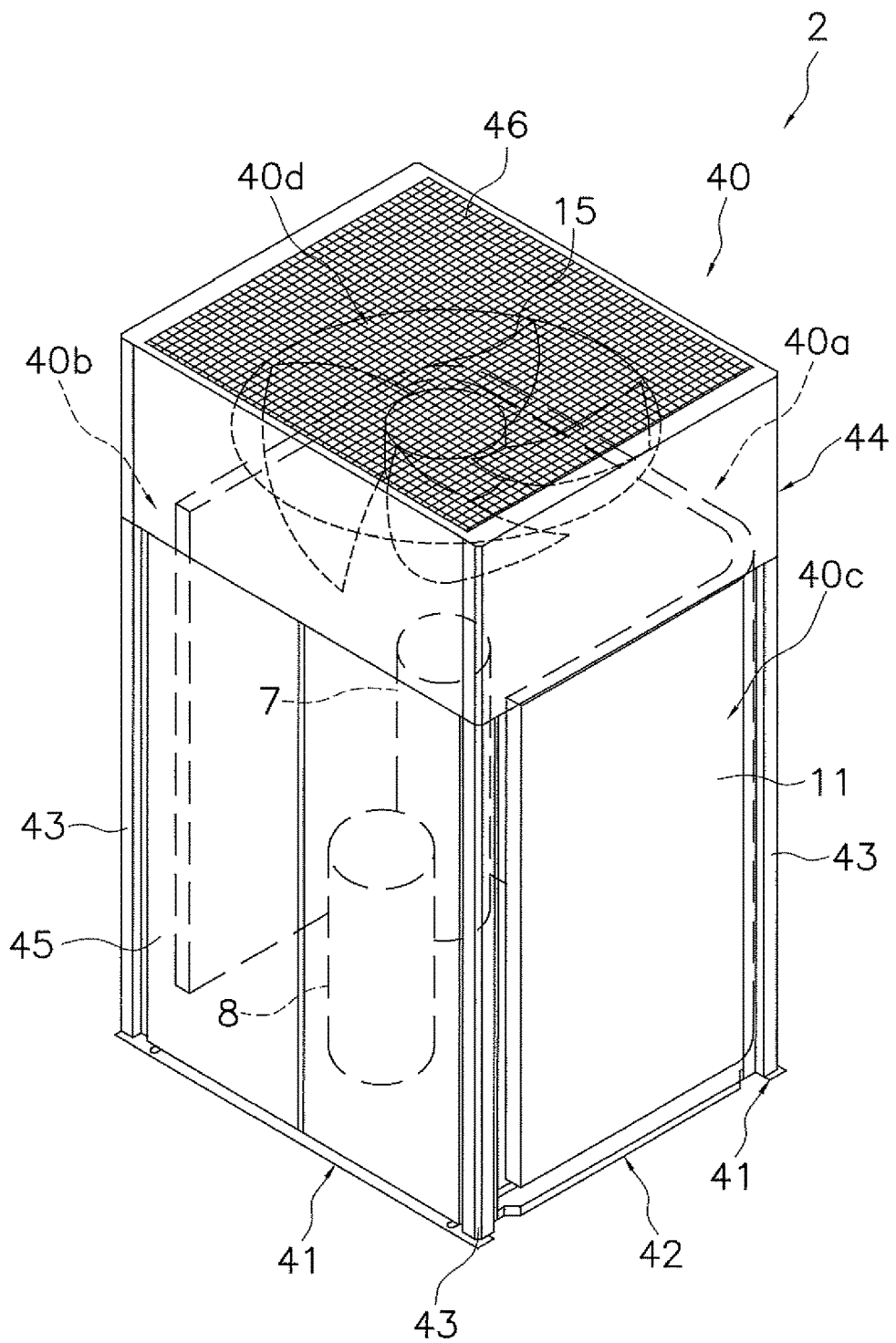
FIG. 2 is an exterior perspective view of an outdoor unit according to one or more embodiments.
Figure 3:
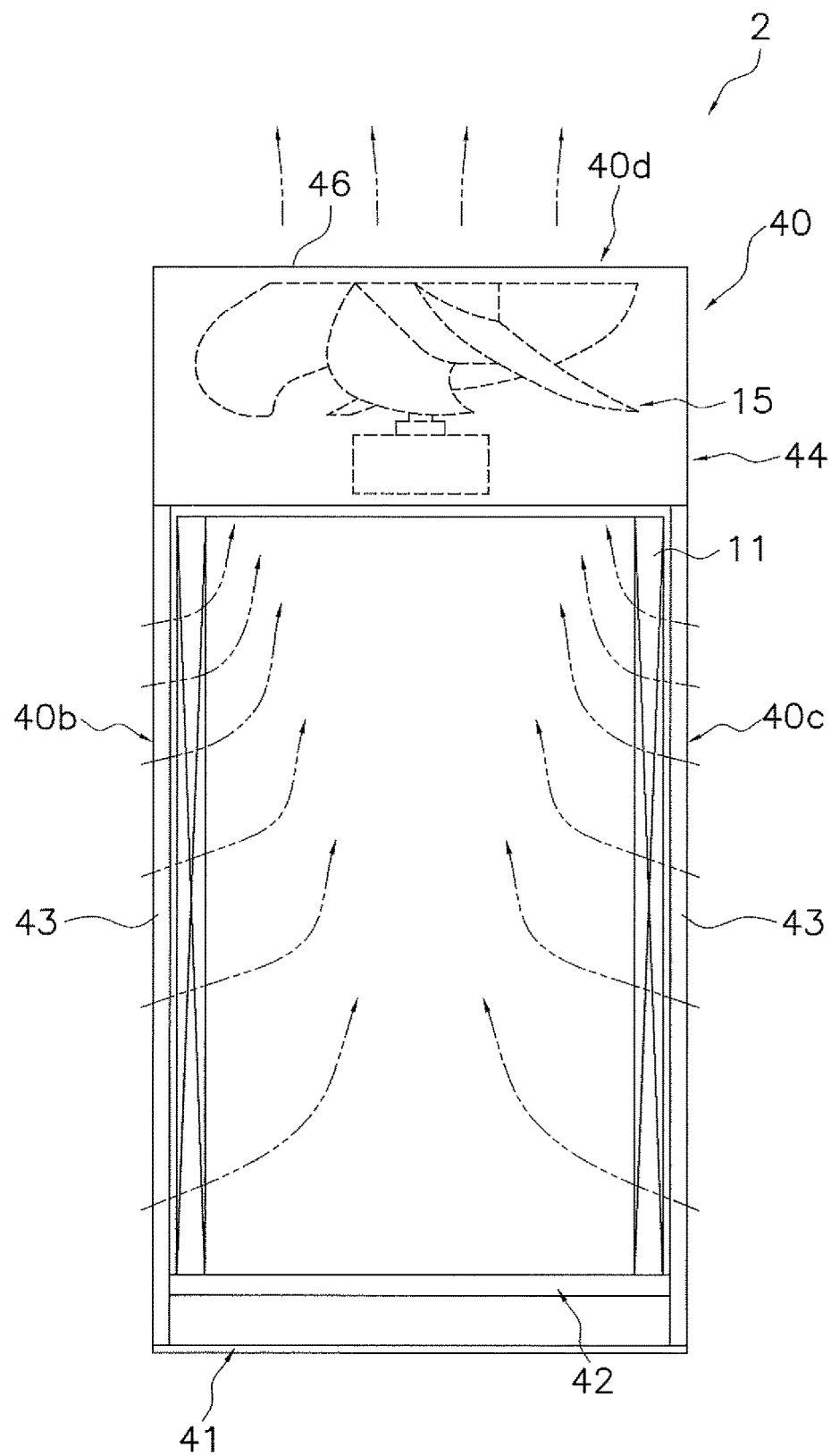
FIG. 3 is a front view (illustration in which refrigerant circuit components other than the outdoor heat exchanger are excluded) of the outdoor unit according to one or more embodiments.

FIG. 2 is an exterior perspective view of the outdoor unit 2. FIG. 3 is a front view (illustration in which refrigerant circuit components other than the outdoor heat exchanger 11 are excluded) of the outdoor unit 2.

The outdoor unit 2 has a structure, called a top-blow-type structure, that intakes air through side surfaces of a casing 40 and blows out the air through a top surface of the casing 40.

The outdoor unit 2 includes, mainly, the casing 40 having a substantially rectangular parallelepipedal box shape, the outdoor fan 15, and the refrigerant circuit components including the devices 7, 8, and 11, such as the compressor and the outdoor heat exchanger, the valves 10 and 12 to 14, such as the four-way switching valve and the outdoor expansion valve, the refrigerant pipes 16 to 22, and the like, the refrigerant circuit components constituting part of the refrigerant circuit 6. Note that "upper", "lower", "left", "right", "front", "rear", "front surface", and "rear surface" intend to be in a direction in which the outdoor unit 2 illustrated in FIG. 2 is viewed from the front (left oblique front in the drawings) unless specified otherwise.

The casing 40 includes, mainly, a bottom frame 42 bridged over a pair of installation legs 41 extending in the left-right direction, supports 43 extending in the vertical direction from corner portions of the bottom frame 42, a fan module 44 attached to upper ends of the supports 43, and a front panel 45.

The bottom frame 42 forms the bottom surface of the casing 40, and the outdoor heat exchanger 11 is disposed on the bottom frame 42. The outdoor heat exchanger 11 is a heat exchanger that has a substantially U-shape in plan view and faces the rear surface and the left and right side surfaces of the casing 40. The outdoor heat exchanger 11 substantially forms the rear surface and the left and right side surfaces of the casing 40.

The fan module 44 is disposed on the upper side of the outdoor heat exchanger 11 and forms the top surface of the casing 40 and a portion of each of the front surface, the rear surface and the left and right surfaces of the casing 40 on the upper side of the supports 43. The fan module 44 is an assembly in which the outdoor fan 15 is housed in a substantially rectangular parallelepipedal box that has an open upper surface and an open lower surface, and a blow-out grill 46 is disposed in the opening of the upper surface.

The front panel 45 is bridged over the supports 43 on the front surface side and forms the front surface of the casing 40.

The outdoor fan 15 and the refrigerant circuit components (the accumulator 7, the compressor 8, and the refrigerant pipes 16 to 18 are illustrated in FIG. 2) other than the outdoor heat exchanger 11 are also housed inside the casing 40. The compressor 8 and the accumulator 7 are disposed on the bottom frame 42.

(4) Basic Configuration of Outdoor Heat Exchanger

Figure 4:
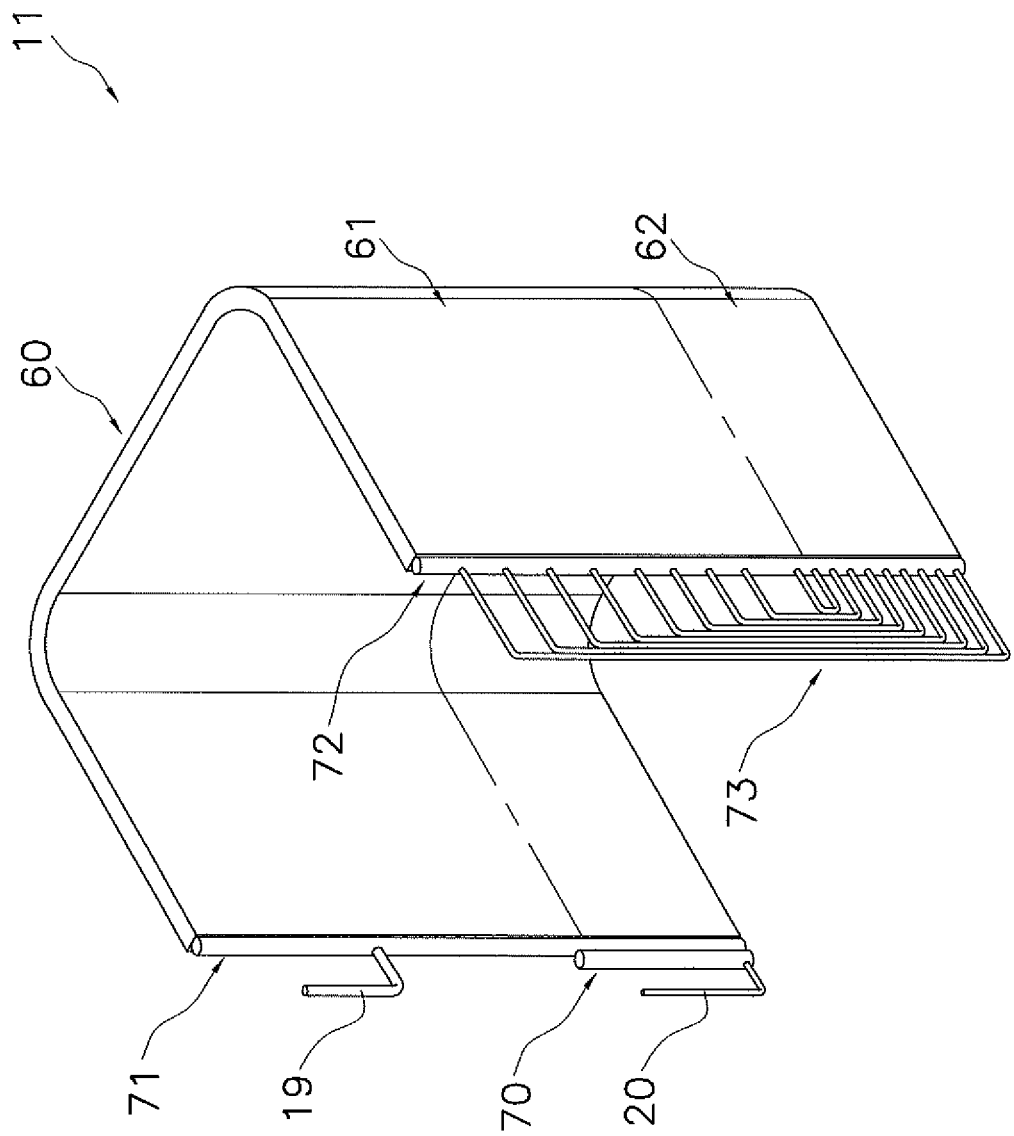
FIG. 4 is a schematic perspective view of the outdoor heat exchanger according to one or more embodiments.
Figure 5:
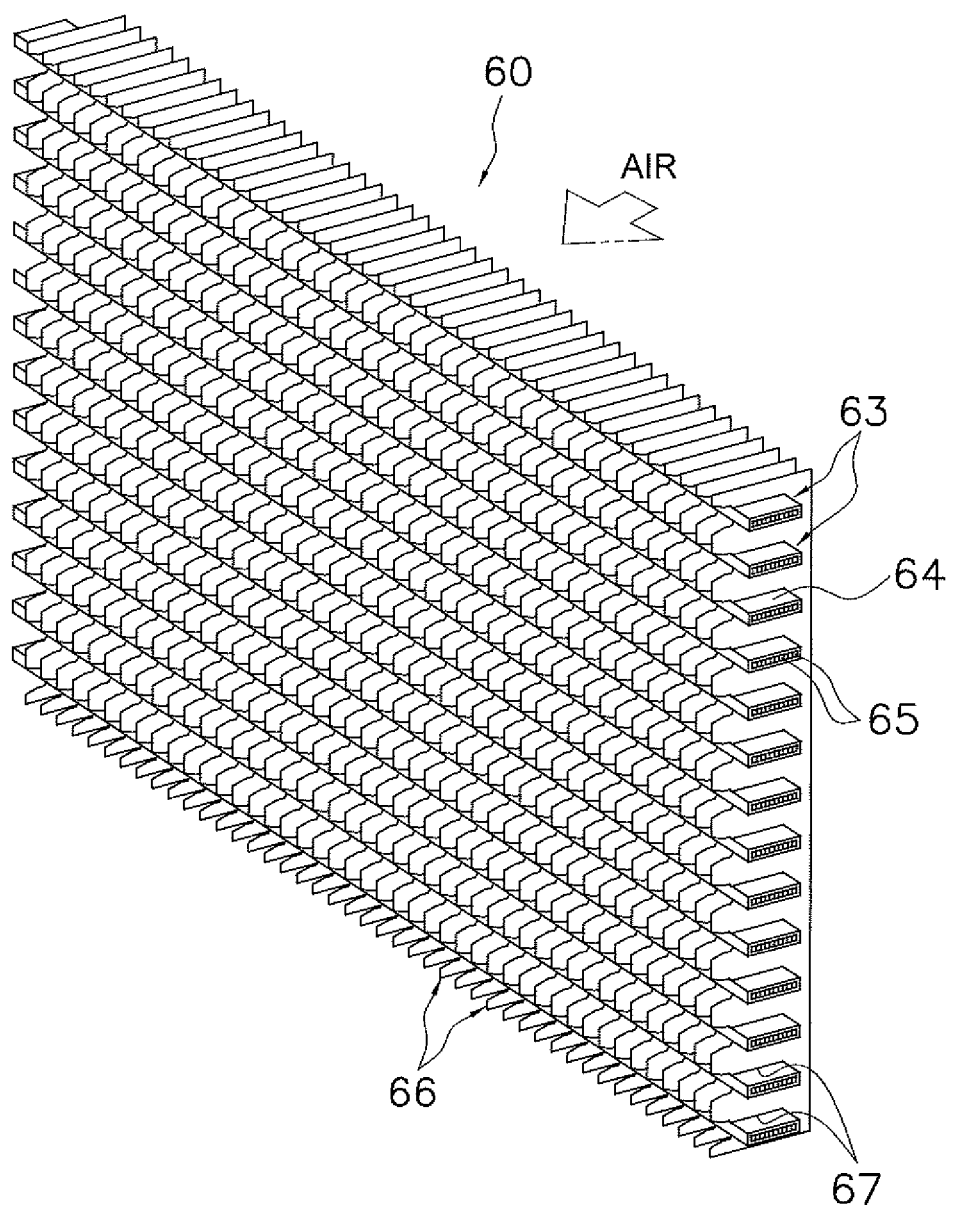
FIG. 5 is a partial enlarged view of a heat exchanging part in FIG. 4.

FIG. 4 is a schematic perspective view of the outdoor heat exchanger 11. FIG. 5 is a partial enlarged view of a heat exchanging part 60 in FIG. 4.

The outdoor heat exchanger 11 includes, mainly, the heat exchanging part 60 that exchanges heat between outdoor air and a refrigerant, a refrigerant distributor 70 and an entrance header 71 that are disposed on one side (here, the left front side in FIG. 4) of the heat exchanging part 60, and an intermediate header 72 disposed on the other side (here, the right front side in FIG. 4) of the heat exchanging part 60. The outdoor heat exchanger 11 is an all-aluminum heat exchanger in which all of the refrigerant distributor 70, the entrance header 71, the intermediate header 72, and the heat exchanging part 60 are made of aluminum or an aluminum alloy, and each part is joined by brazing, such as by brazing in a furnace.

The heat exchanging part 60 includes a main heat exchanging part 61 constituting the upper part of the outdoor heat exchanger 11 and a subsidiary heat exchanging part 62 constituting the lower part of the outdoor heat exchanger 11.

The heat exchanging part 60 is an insertion-fin-type heat exchanging part constituted by a large number of heat transfer tubes 63 formed by flat pipes and a large number of heat transfer fins 66 formed by insertion fins. The heat transfer tubes 63 are made of aluminum or an aluminum alloy and are each formed by a flat multi-hole tube that has flat surfaces 64, which serve as heat transfer surfaces, and a large number of small internal flow paths 65 in which a refrigerant flows. The large number of heat transfer tubes 63 are arranged in a plurality of stages in the up-down direction in a state in which the flat surfaces 64 are directed upward and downward. One end thereof (here, the left front end in FIG. 4) in the longitudinal direction is connected to the entrance header 71, and the other end thereof (here, the right front end in FIG. 4) in the longitudinal direction is connected to the intermediate header 72. In other words, the large number of heat transfer tubes 63 are arranged between the entrance header 71 and the intermediate header 72. The longitudinal direction of the heat transfer tubes 63 extends parallel to the horizontal direction along the side surfaces (here, the left and right side surfaces) and the rear surface of the casing 40, that is, a direction (fin stacking direction) intersecting an air flow direction. The heat transfer fins 66 are made of aluminum or an aluminum alloy, and a plurality of the heat transfer fins 66 are arranged in a direction (fin stacking direction) in the longitudinal direction of the heat transfer tubes 63 with an interval therebetween. The heat transfer fins 66 each include a large number of cutouts 67 extending from the leeward side toward the windward side in the air flow direction and into which the plurality of heat transfer tubes 63 are inserted. Here, the direction in which the flat surfaces 64 of the heat transfer tubes 63 are directed is the up-down direction, and the longitudinal direction of the heat transfer tubes 63 is the horizontal direction along the side surfaces (here, the left and right side surfaces) and the rear surface of the casing 40; thus, the direction in which the cutouts 67 extend corresponds to the horizontal direction intersecting the longitudinal direction of the heat transfer tubes 63 and substantially coincides with the air flow direction in the casing 40. Each of the cutouts 67 extends in the horizontal direction in a long and narrow shape so that the heat transfer tubes 63 are inserted thereinto from the leeward side toward the windward side in the air flow direction. Here, the large number of heat transfer tubes 63 are grouped into a heat transfer tube group that constitutes the main heat exchanging part 61 and a heat transfer tube group that constitutes the subsidiary heat exchanging part 62.

The refrigerant distributor 70 is connected between a liquid refrigerant pipe 20 and the lower part of the entrance header 71. The refrigerant distributor 70 is a member that is made of aluminum or an aluminum alloy and that extends in the vertical direction. The refrigerant distributor 70 is configured to distribute and guide a refrigerant that flows in through a liquid refrigerant pipe 20 into the lower part of the entrance header 71 and is configured to merge and guide a refrigerant that flows in through the lower part of the entrance header 71 into a liquid refrigerant pipe 20.

The entrance header 71 is disposed on one side (here, the left front side in FIG. 4) of the heat exchanging part 60. One end (here, the left front end) of each of the heat transfer tubes 63 constituting the heat exchanging part 61 is connected to the entrance header 71. The entrance header 71 is a member that is made of aluminum or an aluminum alloy and that extends in the vertical direction. An internal space of the entrance header 71 is partitioned into an upper space and a lower space by a baffle (not illustrated). The upper space is in communication with one end (here, the left front end) of each of the heat transfer tubes 63 that constitute the main heat exchanging part 61, and the lower space is in communication with the one end (here, the left front end) of each of the heat transfer tubes 63 that constitute the subsidiary heat exchanging part 62. The upper part of the entrance header 71 is connected to a gas refrigerant pipe 19 and configured to exchange a refrigerant between the heat exchanging part 60 and the gas refrigerant pipe 19. The lower part of the entrance header 71 is connected to the refrigerant distributor 70 and configured to exchange a refrigerant with the refrigerant distributor 70.

The intermediate header 72 is disposed on the other side (here, the right front side in FIG. 4) of the heat exchanging part 60. The other end (here, the right front end) of each of the heat transfer tubes 63 that constitute the heat exchanging part 60 is connected to the intermediate header 72. The intermediate header 72 is a member that is made of aluminum or an aluminum alloy and that extends in the vertical direction. An internal space of the intermediate header 72 is partitioned into an upper space and a lower space by a baffle (not illustrated). The upper space is in communication with the other end (here, the right front end) of each of the heat transfer tubes 63 that constitute the main heat exchanging part 61, and the lower space is communication with the other end (here the right front end) of each of the heat transfer tubes 63 that constitute the subsidiary heat exchanging part 62. Each of the upper space and the lower space of the intermediate header 72 is partitioned into a plurality of spaces by a baffle or baffles (not illustrated) in accordance with the number of paths of the heat exchanging part 60. The upper space and the lower space are in communication with each other through communication pipes 73 and the like. The intermediate header 72 is configured to exchange a refrigerant between the main heat exchanging part 61 and the subsidiary heat exchanging part 62.

(5) Detailed Configuration of Heat Transfer Fin

Figure 6:
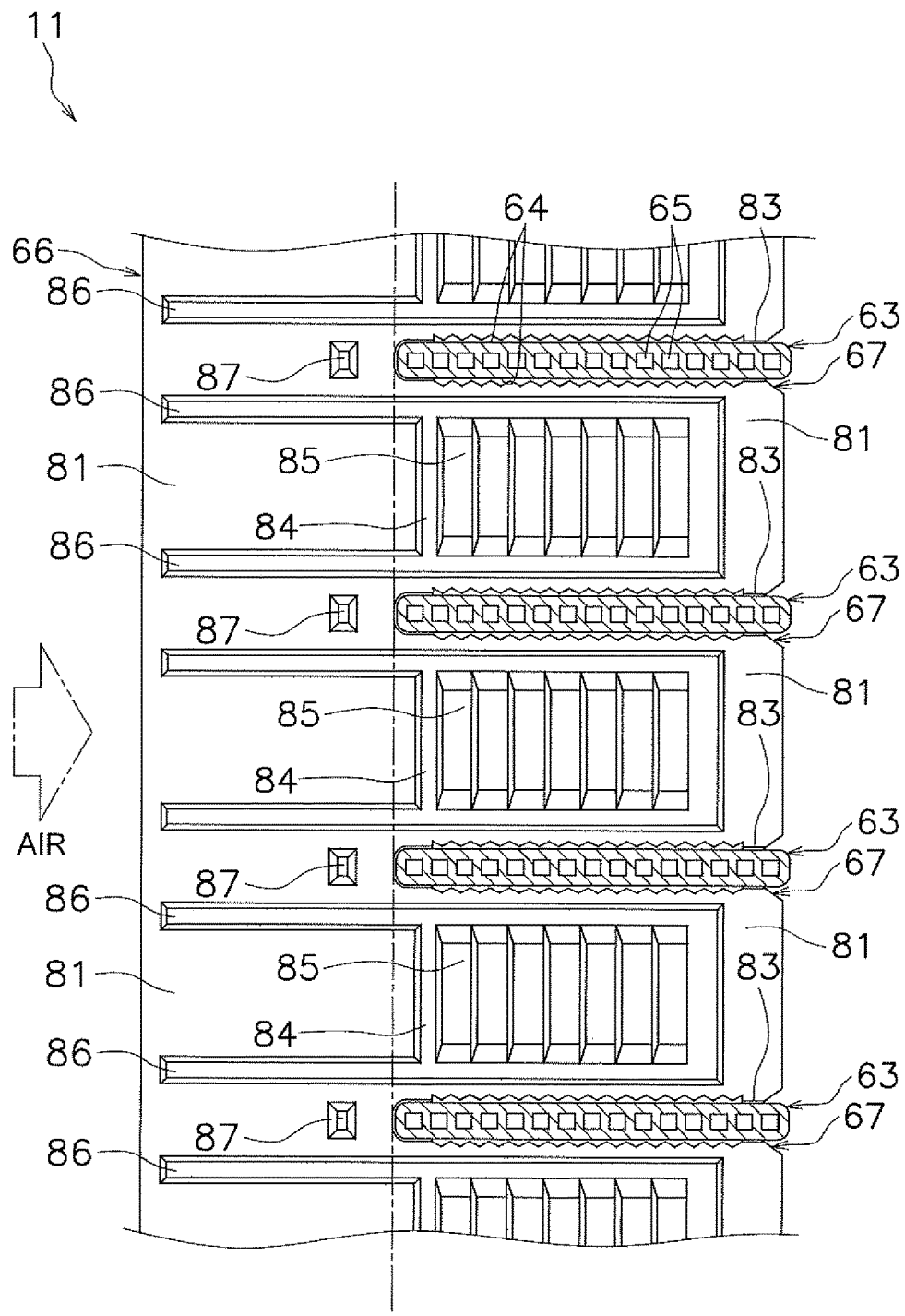
FIG. 6 is a partial enlarged view illustrating a state in which the heat exchanging part in FIG. 5 is viewed in a direction (fin stacking direction) in the longitudinal direction of heat transfer tubes.
Figure 7:
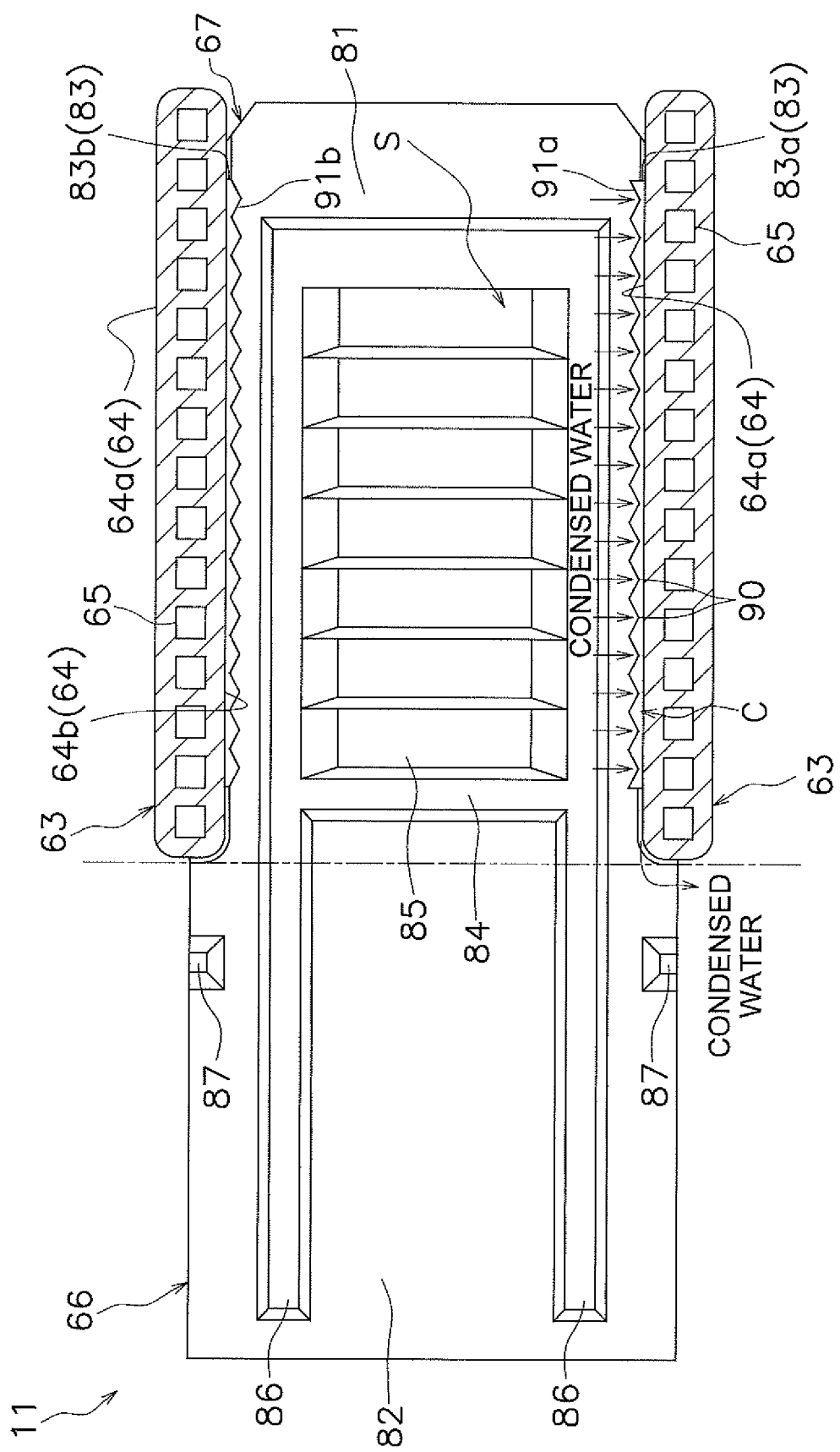
FIG. 7 is a partial enlarged view of FIG. 6.
Figure 8:
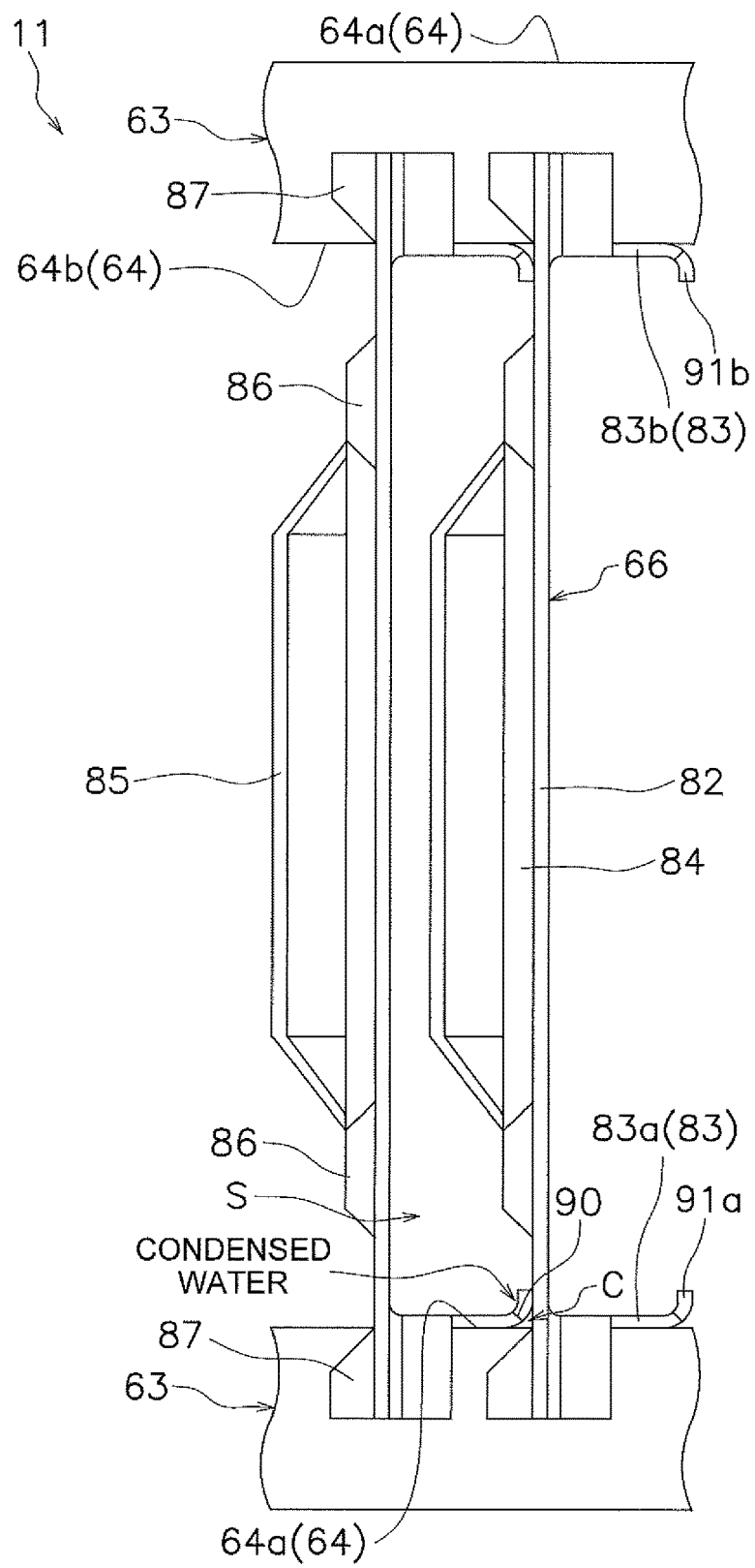
Figure 9:
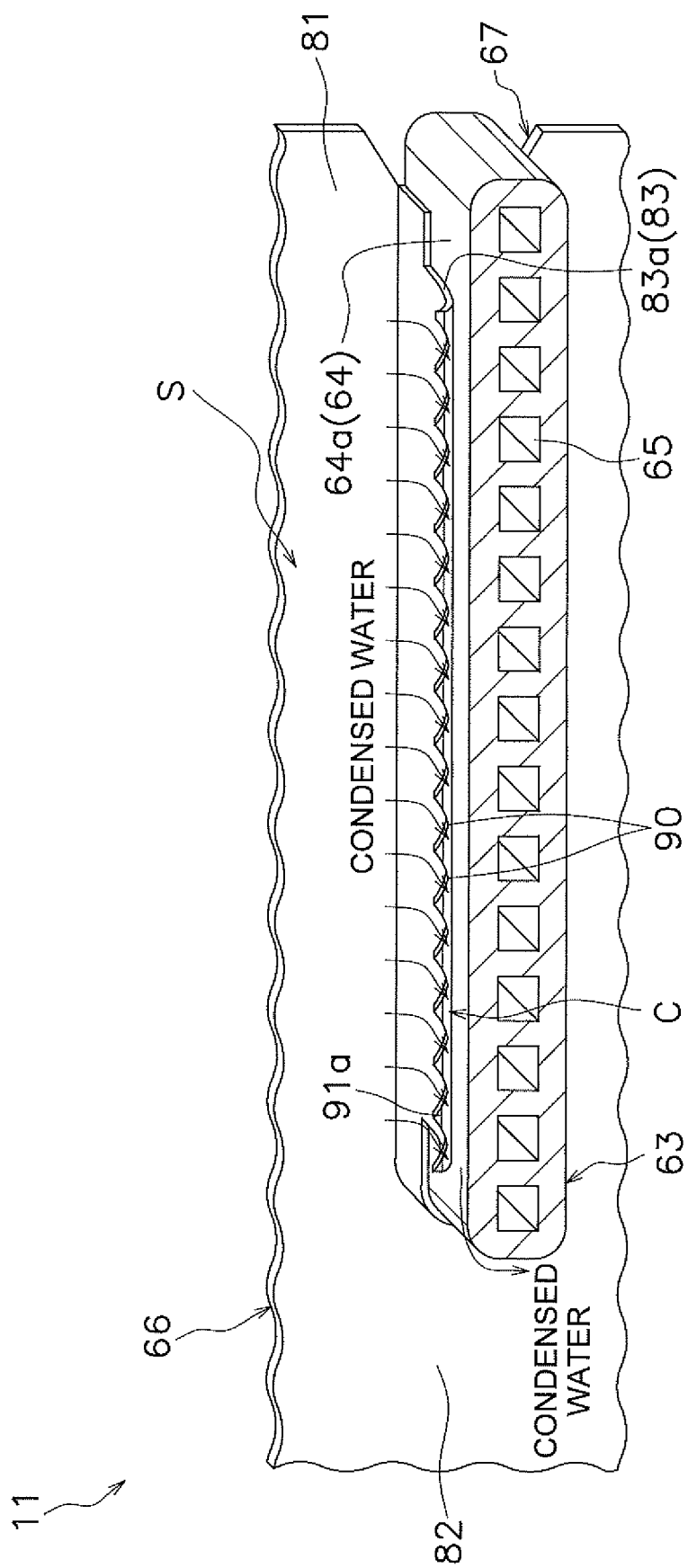
FIG. 9 is an enlarged perspective view of FIG. 7.
Figure 10:
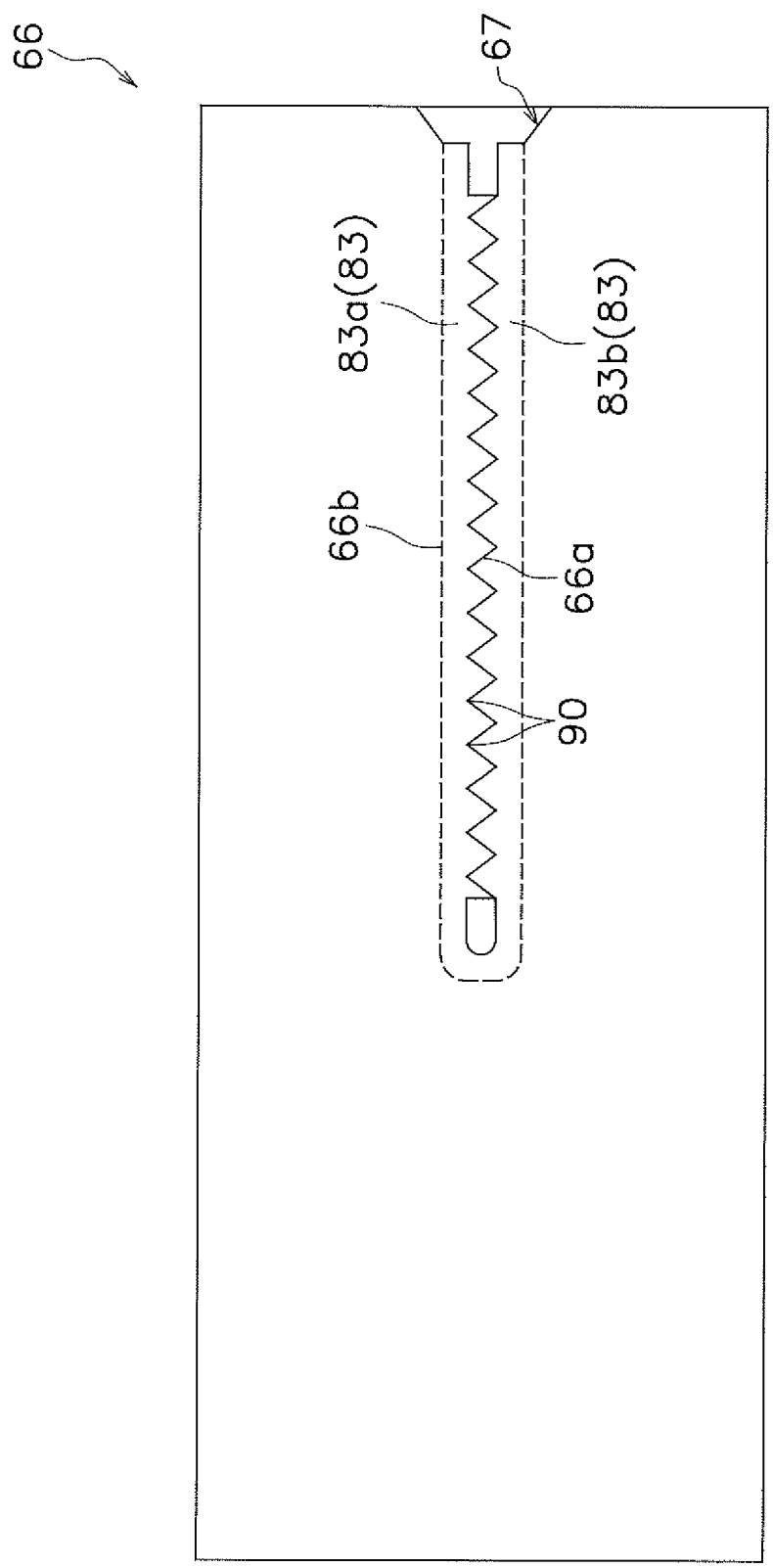
FIG. 10 is a view illustrating a method of forming a fin collar part according to one or more embodiments.

FIG. 6 is a partial enlarged view illustrating a state in which the heat exchanging part 60 in FIG. 5 is viewed in the direction (fin stacking direction) in the longitudinal direction of the heat transfer tubes 63. FIG. 7 is a partial enlarged view of FIG. 6. FIG. 8 is a view in which FIG. 7 is viewed from the windward side in the air flow direction. FIG. 9 is an enlarged perspective view of FIG. 7. FIG. 10 is a view illustrating a method of forming a fin collar part 83.

<Basic Shape>

The heat transfer fins 66 are plate-shaped fins that are formed by pressing plate materials made of aluminum or an aluminum alloy and that are elongated in one direction (here, vertically long). The heat transfer fins 66 are stacked in the fin stacking direction (the direction in the longitudinal direction of the heat transfer tubes 63).

The large number of cutouts 67 of the heat transfer fins 66 are formed in the up-down direction of the heat transfer fins 66 with a predetermined interval therebetween. The heat transfer fins 66 each include a plurality of fin main parts 81 between the cutouts 67 that are adjacent to each other in the up-down direction and a fin windward part 82 extending on the windward side of the plurality of cutouts 67 in the air flow direction continuously with the plurality of fin main parts 81. The fin collar part 83 extending toward one side (the front side in FIG. 6 and FIG. 7; the right side in FIG. 8) in the fin stacking direction is formed at the peripheral portion of each of the cutouts 67. Here, a portion of each of the fin collar parts 83 along a flat upper surface 64a, which is the flat surface on the upper side of the heat transfer tube 63, is a fin collar upper portion 83a, and a portion of each of the fin collar parts 83 along a flat lower surface 64*b*, which is the flat surface on the lower side of the heat transfer tube 63, is a fin collar lower portion 83*b*.

Each of the heat transfer fins 66 is protruded to form a base portion 84 in the fin main part 81 corresponding thereto. The base portion 84 protrudes toward the other side (the deep side in FIG. 6 and FIG. 7; the left side in FIG. 8) in the fin stacking direction so as to form a substantially rectangular flat surface. Each of the heat transfer fins 66 is cut and raised to form a plurality of louvers 85 in the flat surface of the base portion 84 corresponding thereto. Consequently, it is intended that heat-transfer performance be improved while improving the strength of the fin main parts 81.

Each of the heat transfer fins 66 is protruded to form first ribs 86 in the fin windward part 82. The first ribs 86 protrude toward the other side (the deep side in FIG. 6 and FIG. 7; the left side in FIG. 8) in the fin stacking direction in the air flow direction. Here, two first ribs 86 are formed at a windward-side end portion of each of the base portion 84 so as to be integral therewith. Consequently, the strength of the fin windward parts 82 is increased. In addition, each of the heat transfer fins 66 is protruded to form second ribs 87 in the fin windward part 82 corresponding thereto. The second ribs 87 are formed at positions on the windward side of a windward-side end portion of the fin collar part 83 corresponding thereto toward the other end side (the deep side in FIG. 6 and FIG. 7; the left side in FIG. 8) in the fin stacking direction.

In the outdoor heat exchanger 11 in which the heat transfer fins 66 that have such a basic shape are employed, to cause condensed water adhering to the heat transfer fins 66 to drain from portions of the fin main parts 81 on the leeward side in the air flow direction, the condensed water is required to grow at the leeward-side tip portions of the cutouts 67 to a size that enables the condensed water to drip by its own weight. Therefore, it is not possible to smoothly drain the condensed water from the leeward-side tip portions of the cutouts 67. The condensed water thus easily remains in spaces S (refer to FIG. 7 to FIG. 9) that are between the fin main parts 81 adjacent to each other in the fin stacking direction and that are on the upper side of the fin collar upper portions 83*a*, and, as a result, it is difficult to obtain sufficient drainage performance.

Considering the above, here, the following contrivance is applied to the fin collar parts 83 and portions in the vicinity thereof in order to improve performance in draining condensed water adhering to the heat transfer fins 66.

<Structure for Improving Condensed Water Drainage Performance>

First, in the outdoor heat exchanger 11, gaps C extending in the air flow direction are formed between the fin collar upper portions 83*a* and the flat upper surfaces 64*a*, and window portions 90 through which the spaces S that are between the fin main parts 81 adjacent to each other in the fin stacking direction and that are on the upper side of the fin collar upper portions 83*a* and the gaps C are in communication with each other are formed in the fin collar upper portion 83*a*.

Specifically, here, flare portions 91*a* that each curve upward into an R-shape are formed at tips of the fin collar upper portions 83*a*, and the gaps C are formed between the flare portions 91*a* and the flat upper surfaces 64*a*.

Here, the tips (here, the flare portions 91*a*) of the fin collar upper portions 83*a* each have triangular-wave-shaped irregularities, and concave portions of the triangular-wave-shaped irregularities form the window portions 90. A plurality of the window portions 90 (concave portions) are formed at the tips (here, the flare portions 91*a*) of the fin collar upper portions 83*a* in the air flow direction.

As illustrated in FIG. 10, each of the fin collar parts 83 including the fin collar upper portion 83*a* that includes the flare portion 91*a* (including the window portions 90) formed at the tip thereof is formed by previously forming a cutting line 66*a* (the solid line in FIG. 10) that includes the triangular-wave-shaped irregularities on a plate-shaped material that constitutes the heat transfer fin 66 and by raising the plate-shaped material so as to stand upward from a folding line 66*b* (the broken line in FIG. 10) that surrounds the periphery of the cutting line 66*a* while cutting and opening the cutting line 66*a* by burring or the like. Consequently, the folding line 66*b* forms the peripheral portion of the cutout 67, and a portion that stands upward from the folding line 66*b* forms the fin collar part 83 including the fin collar upper portion 83*a* and the fin collar lower portion 83*b*. Here, a flare portion 91*b* that includes triangular-wave-shaped irregularities is formed not only at the tip of the fin collar upper portion 83*a* but also at the tip of the fin collar lower portion 83*b*. Note that the flare portion 91*b* of the fin collar lower portion 83*b* curves downward, in a direction opposite to the direction in which the flare portion 91*a* of the fin collar upper portion 83*a* curves, into an R-shape.

As illustrated in FIG. 10, the tip of the fin collar upper portion 83*a* and the tip of the fin collar lower portion 83*b* are in a state of being fitted to each other at the position of the cutting line 66*a* that includes the triangular-wave-shaped irregularities before the fin collar part 83 is cut and raised. Accordingly, the triangular-wave-shaped concave portions of the flare portion 91*b* of the fin collar lower portion 83*b* are formed so as to face convex portions of the triangular-wave-shaped irregularities of the flare portion 91*a* of the fin collar upper portion 83*a*, and the triangular-wave-shaped convex portions of the flare portion 91*b* of the fin collar lower portion 83*b* are formed so as to face the concave portions of the triangular-wave-shaped irregularities of the flare portion 91*a* of the fin collar upper portion 83*a*. As illustrated in FIG. 8, the fin collar upper portion 83*a* and the fin collar lower portion 83*b* of the fin collar part 83 are in contact with the heat transfer fins 66 adjacent thereto in the fin stacking direction.

As illustrated in FIG. 7 to FIG. 9, due to the gaps C and the window portions 90 described above, it is possible to guide condensed water adhering to the heat transfer fins 66 from the spaces S on the upper side of the fin collar upper portions 83*a* into the gaps C formed between the fin collar upper portions 83*a* and the flat upper surfaces 64*a* through the window portions 90 formed in the fin collar upper portions 83*a*. The condensed water guided into the gaps C flows in the gaps C toward a windward-side tip portions (the end portions on the left side in FIG. 7 and FIG. 9) of the cutouts 67, not toward the leeward-side tip portions (the end portions on the right side in FIG. 7 and FIG. 9) of the cutouts 67. The reason is that condensed water does not drip from the leeward-side tip portions of the cutouts 67 until the condensed water grows to a size that enables the condensed water to drip by its own weight while the windward-side tip portions of the cutouts 67 are connected to the fin windward parts 82 in continuity with the plurality of fin main parts 81, and it is thus possible to send condensed water smoothly from the windward-side tip portions of the cutouts 67 to the fin windward parts 82. As illustrated in FIG. 7 and FIG. 9, the condensed water that have been thus sent to the fin windward parts 82 drains downward through the fin windward parts 82.

Here, the window portions 90 formed in the fin collar upper portions 83a and the gaps C formed between the fin collar upper portions 83a and the flat upper surfaces 64a functioning as condensed-water drainage passages so that condensed water drains through the fin windward parts 82, as described above, it is possible to improve condensed-water drainage performance.

In addition, here, as a result of the window portions 90 being the concave portions provided at the tips of the fin collar upper portions 83a, as described above, it is possible to easily form the fin collar parts 83 in the heat transfer fins 66, and it is consequently possible to suppress an increase in costs of the outdoor heat exchanger 11.

In addition, here, as a result of a plurality of the window portions 90 (concave portions) being formed in the air flow direction, as described above, it is possible to rapidly guide condensed water adhering to the heat transfer fins 66 into the gaps C from the spaces S on the upper side of the fin collar upper portions 83a, and it is consequently possible to further improve the condensed-water drainage performance (refer to FIG. 7 and FIG. 9).

In addition, here, as a result of the gaps C being formed between the flare portions 91a provided at the tips of the fin collar upper portions 83a and the flat upper surfaces 64a and the window portions 90 being formed in the flare portions 91a, as described above, it is possible to easily form the fin collar parts 83 in the heat transfer fins 66, and it is consequently possible to suppress an increase in costs of the outdoor heat exchanger 11.

Moreover, here, as a result of the fin collar upper portions 83a having a function of not only assuring the condensed-water drainage passages (window portions 90 and the gaps C) but also assuring an interval (fin pitch) between the heat transfer fins 66 in the fin stacking direction, as described above, it is possible to omit portions, called fin tabs, formed on existing heat transfer fins.

(6) Modification

<A>

In the aforementioned embodiments, the window portions 90 are formed by the concave portions of the triangular-wave-shaped irregularities; however, the window portions 90 are not limited thereto. For example, the window portions 90 may be formed by concave portions of irregularities having a rectangular shape, a sine wave shape, or the like. Moreover, the window portions 90 may be holes; however, considering ease of forming the fin collar parts 83 through cutting and raising during burring or the like, the window portions 90 are concave portions in one or more embodiments.

<B>

In the aforementioned embodiments, the base portions 84, the louvers 85, and the ribs 86 and 87 are formed in the heat transfer fins 66; however, heat transfer fins in which these portions are formed at different positions or heat transfer fins in which none of these portions are formed may be employed.

<C>

In the aforementioned embodiments, the outdoor heat exchanger 11 disposed in the top-blow-type outdoor unit 2 is presented as an example and described; however, the outdoor heat exchanger 11 is not limited thereto and may be an outdoor heat exchanger disposed in an outdoor unit of another type or may be a heat exchanger disposed in a device other than outdoor units.

Although the disclosure has been described with respect to only a limited number of embodiments, those skill in the art, having benefit of this disclosure, will appreciate that various other embodiments may be devised without departing from the scope of the present invention. Accordingly, the scope of the invention should be limited only by the attached claims.

INDUSTRIAL APPLICABILITY

The present invention is widely applicable to a heat exchanger that includes a plurality of flat pipes and a plurality of heat transfer fins having cutouts into which the flat pipes are inserted.

REFERENCE SIGNS LIST

11 outdoor heat exchanger (heat exchanger)
63 heat transfer tube (flat pipe)
64 flat surface
64a flat upper surface
66 heat transfer fin
67 cutout
81 fin main part
82 fin windward part
83 fin collar part
83a fin collar upper portion
90 window portion
91a flare portion
C gap

CITATION LIST

Patent Literature

Patent Literature 1: Japanese Unexamined Patent Application Publication No. 2012-233680

The invention claimed is:

1. A heat exchanger comprising:
a plurality of flat pipes each having flat surfaces directed upward and downward, wherein the flat pipes are arranged in an up-down direction and extend in a fin stacking direction intersecting an air flow direction; and
a plurality of heat transfer fins stacked in the fin stacking direction and each comprising:
a plurality of cutouts into which the flat pipes are inserted, respectively, wherein the cutouts extend from a leeward side toward a windward side in the air flow direction;
a plurality of fin main parts each formed between adjacent cutouts of the cutouts in the up-down direction;
a fin windward part continuously extending from the fin main parts in the air flow direction toward the windward side of the cutouts; and
a fin collar part extending from a peripheral portion of each of the cutouts toward one side in the fin stacking direction, wherein
a fin collar upper portion is a portion of the fin collar part along an upper surface of one of the flat pipes, and
the fin collar upper portion comprises:
a window portion through which a gap communicates with a space that is between, in the fin stacking direction, adjacent fin main parts of the fin main parts and the space is on an upper side of the fin collar upper portion; and
a flare portion having a tip that curves upward into an R-shape, wherein the gap extends in the air flow direction and is surrounded by the flare portion, the upper surface of the one of the flat pipes, and the adjacent fin main parts, and the window portion is formed in the flare portion.

2. The heat exchanger according to claim 1, wherein a tip of the fin collar upper portion has a first concave portion, and the first concave portion forms the window portion.

3. The heat exchanger according to claim 2, wherein the fin collar upper portion has at least one second concave portion along the air flow direction.

4. The heat exchanger according to claim 1, wherein the fin collar upper portion is in contact with at least one of the heat transfer fins, and said at least one of the heat transfer fins being adjacent to the fin collar upper portion in the fin stacking direction.

* * * * *